United States Patent
Shin et al.

(10) Patent No.: US 11,491,765 B2
(45) Date of Patent: Nov. 8, 2022

(54) PREPARATION METHOD FOR COMPOSITE MATERIAL

(71) Applicant: LG CHEM, LTD., Seoul (KR)

(72) Inventors: Jong Min Shin, Daejeon (KR); Jin Kyu Lee, Daejeon (KR); Dong Woo Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 388 days.

(21) Appl. No.: 16/628,064

(22) PCT Filed: Jul. 6, 2018

(86) PCT No.: PCT/KR2018/007706
§ 371 (c)(1),
(2) Date: Jan. 2, 2020

(87) PCT Pub. No.: WO2019/009671
PCT Pub. Date: Jan. 10, 2019

(65) Prior Publication Data
US 2020/0172764 A1    Jun. 4, 2020

(30) Foreign Application Priority Data

Jul. 6, 2017   (KR) .......... 10-2017-0086013

(51) Int. Cl.
*B32B 15/08*    (2006.01)
*C09J 7/38*    (2018.01)
(Continued)

(52) U.S. Cl.
CPC ............. *B32B 15/08* (2013.01); *B22F 3/26* (2013.01); *C09J 7/385* (2018.01); *B22F 7/04* (2013.01);
(Continued)

(58) Field of Classification Search
CPC ........ B32B 2255/062; B32B 2260/046; B32B 2266/045; B32B 38/10; B22F 3/26
See application file for complete search history.

(56) References Cited

U.S. PATENT DOCUMENTS

| | | | |
|---|---|---|---|
| 4,515,672 A * | 5/1985 | Platek | ............ C25C 7/02 588/900 |
| 8,114,511 B2 | 2/2012 | Akita | |

(Continued)

FOREIGN PATENT DOCUMENTS

| | | |
|---|---|---|
| CN | 101874319 A | 10/2010 |
| CN | 102015948 A | 4/2011 |

(Continued)

OTHER PUBLICATIONS

International Search Report corresponding to PCT/KR2018/007706, dated Jan. 2, 2019 (5 pp included English translation).
(Continued)

*Primary Examiner* — Scott W Dodds
(74) *Attorney, Agent, or Firm* — Myers Bigel, P.A.

(57) ABSTRACT

The present application provides a method for preparing a composite material. The present application provides a method for preparing a composite material comprising a metal porous body and a polymer component, wherein the polymer component is formed in an asymmetrical structure, and a composite material prepared in such a manner.

12 Claims, 4 Drawing Sheets

(51) Int. Cl.
  *B22F 3/26* (2006.01)
  *B22F 7/04* (2006.01)
  *B32B 38/10* (2006.01)

(52) U.S. Cl.
  CPC ......... *B32B 38/10* (2013.01); *B32B 2255/062* (2013.01); *B32B 2260/046* (2013.01); *B32B 2266/045* (2013.01); *C09J 2433/00* (2013.01)

(56) References Cited

U.S. PATENT DOCUMENTS

| | | |
|---|---|---|
| 9,562,173 B2 | 2/2017 | Jeon et al. |
| 2016/0303843 A1 | 10/2016 | Jang et al. |
| 2016/0312074 A1 | 10/2016 | Choi et al. |

FOREIGN PATENT DOCUMENTS

| | | |
|---|---|---|
| CN | 103173150 A | 6/2013 |
| CN | 103261254 A | 8/2013 |
| CN | 103797077 A | 5/2014 |
| CN | 103931027 A | 7/2014 |
| CN | 103935080 | 7/2014 |
| CN | 106893261 | 6/2017 |
| EP | 2261398 A1 | 12/2010 |
| JP | H06104093 A | 4/1994 |
| JP | 5189300 | 4/2013 |
| JP | 2014101441 | 6/2014 |
| JP | 2016135562 | 7/2016 |
| JP | 2019085439 A | 6/2019 |
| KR | 1020070079891 | 8/2007 |
| KR | 100969194 | 7/2010 |
| KR | 1020130127391 | 11/2013 |
| KR | 1020160124273 | 10/2016 |

OTHER PUBLICATIONS

Banhart et al. "Aluminium Foam Sandwich Panels: Manufacture, Metallurgy and Applications" Advanced Engineering Materials. 10(9):793-802 (2008).
Extended European Search Report corresponding to EP 18827830.3; dated Mar. 10, 2020 (17 pages).

* cited by examiner

PREPARATION METHOD FOR COMPOSITE MATERIAL

CROSS REFERENCE TO RELATED APPLICATIONS

This application is a 35 U.S.C. § 371 national stage application of PCT International Application No. PCT/KR2018/007706, filed Jul. 6, 2018, which claims priority from Korean Patent Application No. 10-2017-0086013, filed Jul. 6, 2017, the contents of which are incorporated herein in their entireties by reference. The above-referenced PCT International Application was published in the Korean language as International Publication No. WO 2019/009671 on Jan. 10, 2019.

TECHNICAL FIELD

The present application relates to a method for preparing a composite material.

BACKGROUND ART

Metal foams can be applied to various fields including lightweight structures, transportation machines, building materials or energy absorbing devices, and the like by having various and useful properties such as lightweight properties, energy absorbing properties, heat insulating properties, refractoriness or environment-friendliness.

Metal foams not only have a high specific surface area, but also can further improve the flow of fluids, such as liquids and gases, or electrons, and thus can also be usefully used by being applied in a substrate for a heat exchanger, a catalyst, a sensor, an actuator, a secondary battery, a gas diffusion layer (GDL) or a microfluidic flow controller, and the like.

A composite material in which the metal foam and a resin component are combined with each other can be manufactured for the purpose of expanding application fields of the metal foam or reinforcing physical properties, and the like.

DISCLOSURE

Technical Problem

The present application is intended to provide a method for preparing a composite material and a composite material prepared by the method.

Technical Solution

The present application relates to a method for preparing a composite material and a composite material thereof. The term composite material may mean a material comprising a metal porous body (metal foam or the like) and a polymer component.

In this specification, the term metal porous body (metal foam or the like) or metal skeleton means a porous structure comprising a metal as a main component. Here, the metal as a main component means that the ratio of the metal is 55 weight % or more, 60 weight % or more, 65 weight % or more, 70 weight % or more, 75 weight % or more, 80 weight % or more, 85 weight % or more, 90 weight % or more, or 95 weight % or more based on the total weight of the metal porous body (metal foam or the like) or the metal skeleton. The upper limit of the ratio of the metal contained as the main component is not particularly limited, which may be, for example, 100 weight %, 99 weight % or 98 weight % or so.

In this specification, the term porous property may mean a case where porosity is at least 30% or more, 40% or more, 50% or more, 60% or more, 70% or more, 75% or more, or 80% or more. The upper limit of the porosity is not particularly limited, and may be, for example, less than about 100%, about 99% or less, or about 98% or less, 95% or less, 90% or less, 85% or less, 80% or less, or 75% or less or so. The porosity can be calculated in a known manner by calculating the density of the metal porous body (metal foam or the like) or the like.

The metal porous body (metal foam or the like) included in the composite material of the present application may be in a film shape. The composite material of the present application may comprise a metal porous body (metal foam or the like) in the film form as above and a polymer component present on at least one surface of the opposite surfaces of the metal porous body (metal foam or the like). That is, in the composite material, the polymer component may also exist on both opposite surfaces of the metal porous body (metal foam or the like), and the polymer component may also exist only on one surface. Here, the both opposite surfaces may mean surfaces facing each other such as upper and lower surfaces or both sides of a metal porous body (metal foam or the like) in the form of a film. Hereinafter, for convenience, among the surfaces facing each other, a surface having a relatively large amount of polymer component may be referred to as a first surface and a surface where the polymer component is not present or is less present over the first surface as the opposite surface may be referred to as a second surface.

In the composite material, the metal porous body (metal foam or the like) may have porosity in a range of about 40% to 99%. In one example, the porosity of the metal porous body (metal foam or the like) or the size of the pores, and the like can be controlled in consideration of a desired asymmetric structure in forming the composite material in a manner to be described below. For example, in forming an asymmetric structure by a method to be described below, when the porosity of the metal porous body (metal foam or the like) is small or the size of the pores is small, the degree that the light irradiated from one surface reaches the other surface is reduced and on the contrary, when it is large, the degree of reacting the other surface is increased, whereby a curing degree of a photocurable composition on the opposite surface can be controlled. In another example, the porosity may be 50% or more, 60% or more, 70% or more, 75% or more, or 80% or more, or may be 95% or less, 90% or less, 85% or less, or 80% or less or so.

The metal porous body (metal foam or the like) may be in the form of a film. In this case, the thickness of the film can be adjusted in consideration of the shape of the desired asymmetric structure or the like in manufacturing the composite material according to a manner to be described below. That is, as the thickness of the film form becomes thicker, the region masked by a pressure-sensitive adhesive layer is relatively smaller than the non-masked region and on the contrary, as it becomes thinner, the masked region is relatively larger than the non-masked region, whereby the asymmetry of the composite material can be controlled. The thickness of the film may be, for example, in a range of about 5 μm to 5 cm. In another example, the thickness may be 4 cm or less, 3 cm or less, 2 cm or less or 1 cm or less, 9000 μm or less, 8000 μm or less, 7000 μm or less, 6000 μm or less, 5000 μm or less, 4000 μm or less, 3000 μm or less, 4000

µm or less, 2000 µm or less, 1000 µm or less, 900 µm or less, 800 µm or less, 700 µm or less, 600 µm or less, 500 µm or less, 400 µm or less, 300 µm or less, or 200 µm or less or so, or may also be 6 µm or more, 7 µm or more, 8 µm or more, 9 µm or more, 10 µm or more, 20 µm or more, 30 µm or more, 40 µm or more, 50 µm or more, 60 µm or more, 70 µm or more, 80 µm or more, 90 µm or more, or 95 µm or more or so.

The skeleton of the metal porous body (metal foam or the like) may be composed of various kinds of metals or metal alloys, which may comprise, for example, one or more metals or metal alloys selected from the group consisting of iron, cobalt, nickel, copper, phosphorus, molybdenum, zinc, manganese, chromium, indium, tin, silver, platinum, gold, aluminum, stainless steel and magnesium, or may consist of the metal or metal alloy.

Such metal porous bodies (metal foams and the like) are variously known, and methods for preparing a metal porous body (metal foam or the like) are also variously known. In the present application, such known metal porous bodies (metal foams and the like) and metal porous bodies (metal foams and the like) prepared by the known methods can be applied.

As a method for preparing a metal porous body (metal foam or the like), a method of sintering a pore-forming agent such as a salt and a composite material of a metal, a method of coating a metal on a support such as a polymer foam and sintering it in this state or a slurry method, and the like is known. Furthermore, the metal porous body (metal foam or the like) can also be prepared by a method disclosed in Korean Patent Application No. 2017-0086014, 2017-0040971, 2017-0040972, 2016-0162154, 2016-0162153 or 2016-0162152, and the like, which is a prior application of the present applicant.

The metal porous body (metal foam or the like) may also be prepared by the induction heating method from the methods described in the prior applications, where the metal porous body (metal foam or the like) may comprise at least a conductive magnetic metal. In this case, the metal porous body (metal foam or the like) may comprise 30 weight % or more, 35 weight % or more, 40 weight % or more, 45 weight % or more, or 50 weight % or more of the conductive magnetic metal on the basis of weight. In another example, the ratio of the conductive magnetic metal in the metal porous body (metal foam or the like) may be about 55 weight % or more, 60 weight % or more, 65 weight % or more, 70 weight % or more, 75 weight % or more, 80 weight % or more, 85 weight % or more, or 90 weight % or more. The upper limit of the ratio of the conductive magnetic metal is not particularly limited, and may be, for example, less than about 100 weight % or 95 weight % or less.

In the present application, the term conductive magnetic metal is a metal having predetermined relative magnetic permeability and conductivity, which may mean a metal capable of generating heat to such an extent that the metal can be sintered by the induction heating method.

In one example, as the conductive metal, a metal having relative magnetic permeability of 90 or more may be used. The relative magnetic permeability ($\mu_r$) is a ratio ($\mu/\mu_0$) of the magnetic permeability ($\mu$) of the relevant material to the magnetic permeability ($\mu_0$) in the vacuum. In another example, the relative magnetic permeability may be 95 or more, 100 or more, 110 or more, 120 or more, 130 or more, 140 or more, 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, 350 or more, 360 or more, 370 or more, 380 or more, 390 or more, 400 or more, 410 or more, 420 or more, 430 or more, 440 or more, 450 or more, 460 or more, 470 or more, 480 or more, 490 or more, 500 or more, 510 or more, 520 or more, 530 or more, 540 or more, 550 or more, 560 or more, 570 or more, 580 or more, or 590 or more. The higher the relative magnetic permeability is, the higher the heat is generated at the time of application of the electromagnetic field for induction heating which is described below, whereby the upper limit is not particularly limited. In one example, the upper limit of the relative magnetic permeability may be, for example, about 300,000 or less.

The conductive magnetic metal may have conductivity at 20° C. of about 8 MS/m or more, 9 MS/m or more, 10 MS/m or more, 11 MS/m or more, 12 MS/m or more, 13 MS/m or more, or 14.5 MS/m or more. The upper limit of the conductivity is not particularly limited, and for example, the conductivity may be about 30 MS/m or less, 25 MS/m or less, or 20 MS/m or less.

A specific example of such a conductive magnetic metal includes nickel, iron or cobalt, and the like, but is not limited thereto.

The composite material disclosed in the present application may be an asymmetric composite material. The term asymmetric composite material means a case where the position of a polymer component that is subjected to complexation with a metal porous body (metal foam or the like) is asymmetric in a composite material. For example, the polymer component formed on both opposite surfaces of the metal porous body (metal foam or the like) in the composite material may have an asymmetric structure. Here, the asymmetric structure means a case where the polymer component present on both surfaces has different ratios.

In one example, the ratio (B/A) of the area ratio (A) of the polymer component present on the first surface of the metal porous body (metal foam or the like) and the area ratio (B) of the polymer component present on the second surface may be in a range of 0 to 0.99. When the ratio (B/A) is 0, it means a case where there is no polymer component on the second surface. Also, here, the area ratio is a percentage of the area covered with the polymer component relative to the area of the surface of the relevant metal porous body (metal foam or the like).

In another example, the ratio (B/A) may be about 0.95 or less, 0.90 or less, 0.85 or less, 0.80 or less, 0.75 or less, 0.70 or less, 0.65 or less, 0.60 or less, 0.55 or less, 0.50 or less, 0.45 or 0.40 or less, but this can be adjusted considering the intended use.

Here, the area ratio (A) of the polymer component present on the first surface is not particularly limited, but may be, for example, about 90% or more, about 91% or more, 92% or more, 93% or more, 94% or more, 95% or more, 96% or more, 97% or more, 98% or more, 99% or more, or may be 100% or so. The area ratio (B) of the polymer component on the second surface may be 0%, that is, the polymer component is not present on the second surface, or may exceed 0%. Also, in one example, the area ratio (B) may be about 99% or less, about 95% or less, about 90% or less, about 85% or less, about 80% or less, about 75% or less, about 70% or less, about 65% or less, about 60% or less, about 55% or less, about 50% or less, about 45% or less, or about 40% or less or so.

In the above example, when the area ratio (B) of the polymer component on the second surface is 0%, that is, when the polymer component is not formed on the second surface, the ratio (P/T) of the length (P) from the first surface to the portion where the polymer component is present in the interior of the metal porous body (metal foam or the like) in the direction of the second surface to the length (T) from the first surface to the second surface may be in a range of 0 to 1. That is, in this case, the polymer component in the interior of the metal porous body (metal foam or the like) may exist in the entire range from the first surface to the second surface (P/T=1), or may not exist in the interior of the metal porous body (metal foam or the like) (P/T=0). In another example, the ratio (P/T) may be more than 0, 0.1 or more, 0.2 or more, 0.3 or more, 0.4 or more, or 0.45 or more, or may be 0.95 or less, 0.9 or less, 0.85 or less, 0.8 or less, 0.75 or less, 0.7 or less, 0.65 or less, 0.6 or less, or 0.55 or less.

Here, the length (P) from the first surface to the portion where the polymer component is present in the interior of the metal porous body (metal foam or the like) as measured in the direction of the second surface may be the length to the deepest point or the length to the shortest point, where the polymer component is present, or an average value of the lengths that the polymeric component is present, as measured from the first surface.

FIG. 1 is a sectional schematic diagram of an asymmetric composite material in which a polymer component exists only on one surface of the composite material, and according to one example of the present application as in the drawing, it may have a form that the polymer component (11) is present from the upper surface of the metal porous body (metal foam or the like) (10) to a certain thickness, the polymer component (11) is not present on the lower surface, and voids are revealed on the lower surface.

Here, the polymer component may be a cured product of a curable composition. The term curable composition means a substance capable of being cured by irradiation of light or application of heat, and the like to form a polymer.

In this specification, the irradiation of light may also include irradiation of particle beams, such as alpha-particle beams, proton beams, neutron beams and electron beams, as well as microwaves, infrared (IR), ultraviolet (UV), X-rays and gamma rays, and the like.

Such a curable composition can be exemplified by an acrylic curable composition, an epoxy curable composition, an isocyanate curable composition, a urethane curable composition, a polyester curable composition, a polyamic acid curable composition, a polyamide curable composition, a phthalonitrile curable composition or a silicone curable composition, and the like. Each of the compositions is a composition that can be cured to form an acrylic polymer component, an epoxy polymer component, an isocyanate polymer component, a urethane polymer component, a polyester polymer component, a polyamic acid polymer component, a polyamide polymer component, a phthalonitrile resin polymer component or a silicone polymer component, and such compositions are variously known in the polymer composition industry, whereby in the present application, an appropriate component can be selected from such known components and used, and if necessary, a complex polymer can also be formed by using two or more components of the foregoing.

Generally, such a composition comprises a polymer component, oligomer component and/or monomer component having a functional group that can be cured by light irradiation or application of heat, and comprises an initiator capable of initiating curing reaction by irradiation of light and/or application of heat, for example, a radical initiator, a cationic initiator, etc., or other curing agents, and the like. Here, the functional group that can be cured by light irradiation or application of heat can be exemplified by a functional group containing a radically polymerizable double bond such as an acryloyl group or a methacryloyl group, or a cationic polymerizable functional group or the like such as a glycidyl group, an alicyclic epoxy group or an oxetanyl group, or a hydrogen atom bonded to a silicon atom, an alkenyl group such as a vinyl group, an isocyanate group, a carboxyl group, a hydroxyl group, an epoxy group, an aziridine group, and the like, but is not limited thereto.

In the structure of the composite material, the thickness of the polymer component present on the first surface of the metal porous body (metal foam or the like) may be in a range of about 1 nm to 1 cm. However, the thickness may be appropriately changed depending on the purpose. In another example, the thickness may be about 100 nm to 100 μm or so.

The thickness (P2T) of the polymer component may be in a range of 0 to 1 cm. However, the thickness may also be appropriately changed depending on the purpose.

In the structure of the composite material, the polymer component present on the second surface may be present in the form of a pillar.

Here, the thickness of the polymer component is a thickness measured with the surface of the relevant metal porous body (metal foam or the like) as the starting point.

However, the weight ratio, the thickness ratio or the thickness, or the shape of the polymer component as mentioned above can be controlled according to applications of the composite material, which is not particularly limited.

The composite material of the present application can be used as a heat insulating material, a heat dissipating material, a soundproof material, a lightweight material, a structural material or an electrode material, and the like.

The composite material having the asymmetric structure as above may be prepared through a step of applying a curable composition to a metal porous body, one surface of which is attached to a pressure-sensitive adhesive layer, that is, for example, the surface of the metal porous body (metal foam or the like) to which the pressure-sensitive adhesive layer is not attached.

For example, as shown in FIG. 2, when one surface of a metal porous body (metal foam or the like) (10) or the like is attached to a pressure-sensitive adhesive layer (13), at least a part of the pressure-sensitive adhesive layer (13) penetrates into the pores of the metal porous body (metal foam or the like) (10) by the porous property of the porous metal body (metal foam or the like) (10). Then, when a curable composition (11) is applied to the surface of the metal porous body (metal foam or the like) (10) in which the pressure-sensitive adhesive layer (13) does not exist, the curable composition (11) does not penetrate into at least the pores in which the pressure-sensitive adhesive layer (13) is present. Of course, if the viscosity or the like of the curable composition (11) is adjusted, the curable composition (11) does not penetrate even into a part of the pores having no pressure-sensitive adhesive layer (13) by adjusting the degree of penetration into the pores. When the curable composition (11) is cured in this state to form a polymer component, an asymmetric composite material having the structure shown in FIG. 1 can be formed. In FIG. 2, the reference numeral 12 is a base film for supporting the pressure-sensitive adhesive layer (13).

In the above method of the present application, in order to adjust the degree of penetration of the pressure-sensitive adhesive layer into the pores of the metal porous body (metal foam or the like), a step of placing the metal porous body (metal foam or the like) on the pressure-sensitive adhesive layer and pressuring the metal porous body to attach the pressure-sensitive adhesive layer may also be performed. That is, the pressure-sensitive adhesive layer can be made to penetrate into more pores by such pressing, whereby the structure of the asymmetric film can be controlled.

Also, alternatively, the degree of penetration of the pressure-sensitive adhesive layer into pores can be controlled even through a method of controlling the thickness of the pressure-sensitive adhesive layer and the structure of the asymmetric film can be controlled.

The kind of the pressure-sensitive adhesive layer applicable in the present application is not particularly limited, where a known general pressure-sensitive adhesive layer may be used. For example, the above method can be performed using a pressure-sensitive adhesive sheet or a pressure-sensitive adhesive film that the pressure-sensitive adhesive layer is formed on one surface thereof. At this time, the applicable pressure-sensitive adhesive includes a known acrylic pressure-sensitive adhesive, silicone pressure-sensitive adhesive, urethane pressure-sensitive adhesive or epoxy pressure-sensitive adhesive, and the like, but is not limited thereto.

After application of the curable composition, the present application may further perform a step of curing the applied curable composition, where the polymer component may also be formed by this process.

The method of performing the curing in the above process is not particularly limited, and a method such as appropriate light irradiation or heat application may be applied depending on the kind of the applied curable composition. If necessary, it may also further perform a step of removing the uncured composition after the curing.

According to the above method, the shapes of the asymmetric structure can be variously adjusted by controlling the curing conditions, for example, the degree or direction of light irradiation, the degree of heat application and the like, the thickness of the pressure-sensitive adhesive layer, the thickness of the curable composition and/or the thickness of the metal porous body (metal foam or the like), or the porosity or pore size of the metal porous body (metal foam or the like).

In one example, the process may form the curable composition on at least one of the first and second surfaces of the porous structure (metal foam or the like) to a thickness in a range of about 1 nm to 2 cm, where the curable composition may be formed in the form of a layer, but is not limited thereto.

The preparation method of the present application may further perform a step of removing the uncured curable composition after the curing.

By this process, the above-described asymmetric structure can be formed. The step of removing the uncured curable composition may be referred to as developing. Such a developing process may be performed in a known manner, and for example, the developing process may be performed using a processing agent or the like known to be capable of removing the uncured composition, where as the processing agent, developers such as ethanol, salt water, N-methylpyrrolidone, methylene chloride, chloroform, toluene, ethylene glycol or propylene glycol monomethyl ether acetate, and the like are known. The developing process can be performed through appropriate treatment using such a developer, and for example, the developing process can be performed by applying the developer in a spray developing manner at a pressure of about 2 bar or more and a temperature range of 20° C. to 50° C.

After the curing step, the method of the present application may further perform a step of removing the pressure-sensitive adhesive layer. The method of removing the pressure-sensitive adhesive layer is not particularly limited. Since the pressure-sensitive adhesive layer has a property of being attached to an adherend by application of pressure and being removed by peeling, an appropriate removal method may be selected depending on the type of the applied pressure-sensitive adhesive layer.

If necessary, the present application may further perform a step of washing pressure-sensitive adhesive residues following the above step, where this step may be performed in a manner similar to the above-described development step.

The thickness of the metal porous body applied in the above process may be, for example, in a range of about 5 μm to 5 cm. In another example, the thickness may be 4 cm or less, 3 cm or less, 2 cm or less or 1 cm or less, 9000 μm or less, 8000 μm or less, 7000 μm or less, 6000 μm or less, 5000 μm or less, 4000 μm or less, 3000 μm or less, 2000 μm or less, 1000 μm or less, 900 μm or less, 800 μm or less, 700 μm or less, 600 μm or less, 500 μm or less, 400 μm or less, 300 μm or less, or 200 μm or less or so, or may be 6 μm or more, 7 μm or more, 8 μm or more, 9 μm or more, 10 μm or more, 20 μm or more, 30 μm or more, 40 μm or more, 50 μm or more, 60 μm or more, 70 μm or more, 80 μm or more, 90 μm or more, or 95 μm or more or so. As described above, the metal porous body may be in a film or sheet shape, and may be a metal foam or the like.

Here, the ratio (T2/T1) of the thickness (T1) of the metal porous body and the thickness (T2) of the pressure-sensitive adhesive layer may be in a range of about 0.05 to 1. However, the thickness ratio may be changed according to the desired asymmetric structure. In another example, the ratio (T2/T1) may be about 0.9 or less, 0.8 or less, 0.7 or less, 0.6 or less, 0.5 or less, 0.4 or less, 0.3 or less, 0.2 or less, or 0.15 or less.

The present application also relates to a composite material, for example, a composite material formed in such a manner.

As described above, such a composite material comprises a metal porous body (metal foam or the like) in the form of a film and a polymer component existing on both opposite surfaces of the metal porous body (metal foam or the like), where the polymer component on both surfaces may have the asymmetric structure as described above.

For the details of the composite material, for example, the kind, thickness, thickness ratio or weight ratio of the metal porous body (metal foam or the like) and the polymer component, the shape of the polymer component, and the like, the above-described contents can be equally applied.

Advantageous Effects

The present application provides a method for preparing a composite material comprising a metal porous body (metal foam or the like) and a polymer component, wherein the polymer component is formed in an asymmetrical structure on both surfaces of the metal porous body (metal foam or the like), and a composite material prepared in such a manner.

MODE FOR INVENTION

Hereinafter, the present application will be described in detail by way of examples and comparative examples, but the scope of the present application is not limited to the following examples.

Example 1

Figure 1:
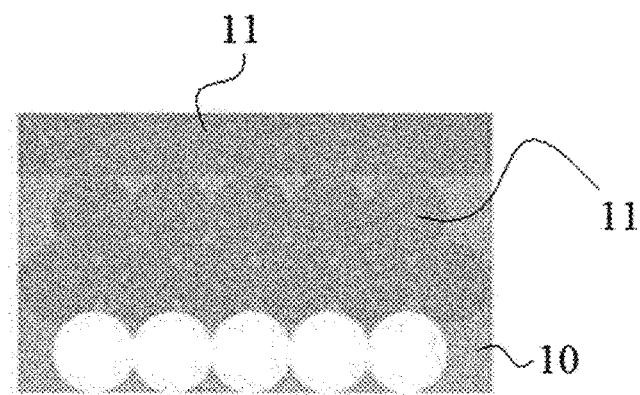
FIG. 1 is a schematic side view of a composite material of the present application.
Figure 2:
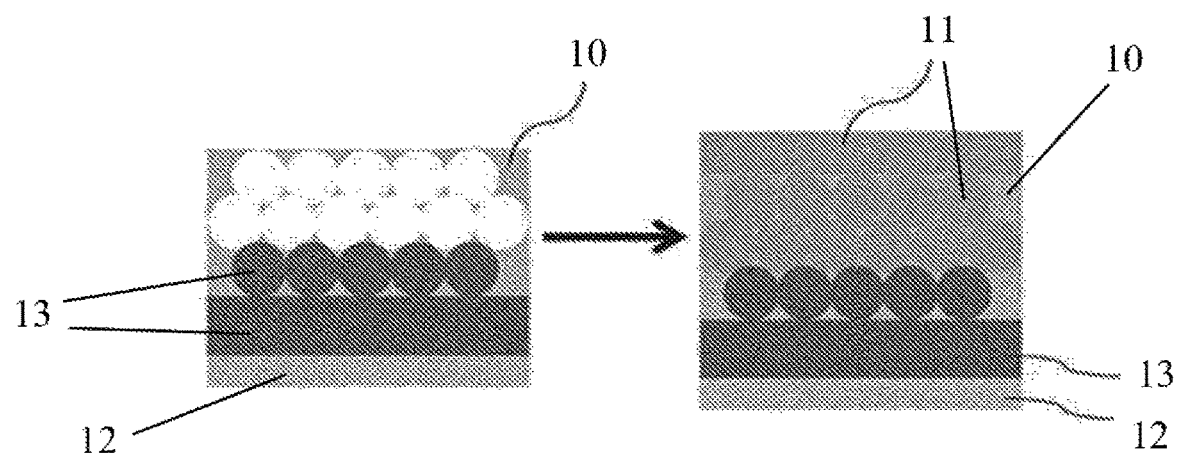
FIG. 2 is an exemplary diagram for explaining a method for preparing a composite material of the present application.
Figure 3:
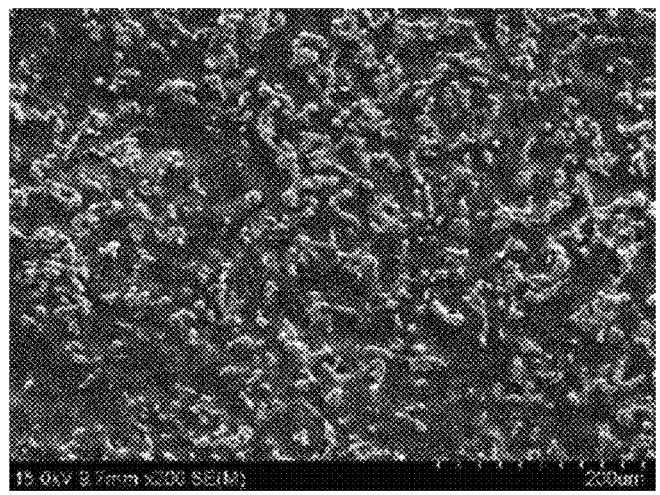
FIG. 3 is a photograph of the composite material formed in Example 1.

A metal porous body was a copper metal foam, where the copper metal foam being in the form of a film having a thickness of about 100 μm or so and having porosity of approximately 75% or so was used. While using a pressure-sensitive adhesive sheet having an acrylic pressure-sensitive adhesive layer with a thickness of about 10 μm or so, the metal foam was placed on the pressure-sensitive adhesive layer and then pressurized with a load of about 3 Kg. Thereafter, polydimethylsiloxane (PDMS, Sylgard 184) was coated on the opposite surface of one surface in contact with the pressure-sensitive adhesive layer of the pressurized copper foam to a thickness of about 20 μm, using a film applicator and thermal curing proceeded in an oven at 120° C. for 20 minutes. After curing, the pressure-sensitive adhesive sheet was removed to prepare a composite material. A scanning electron micrograph of the exposed metal portion of the composite material was shown in FIG. 3.

Example 2

A metal porous body was a copper metal foam, where the copper metal foam being in the form of a film having a thickness of about 100 μm or so and having porosity of approximately 75% or so was used. While using a pressure-sensitive adhesive sheet having an acrylic pressure-sensitive adhesive layer with a thickness of about 10 μm or so, the metal foam was placed on the pressure-sensitive adhesive layer and then pressurized with a load of about 3 Kg. Thereafter, an epoxy resin composition (Kukdo Chemical Co., Ltd., a mixture of YD128 resin and G640 curing agent) was coated on the opposite surface of one surface in contact with the pressure-sensitive adhesive layer of the pressurized copper foam to a thickness of about 20 μm, using a film applicator and thermal curing proceeded in an oven at 80° C. for 60 minutes. Subsequently, the pressure-sensitive adhesive sheet was removed to prepare a composite material.

Example 3

Figure 4:
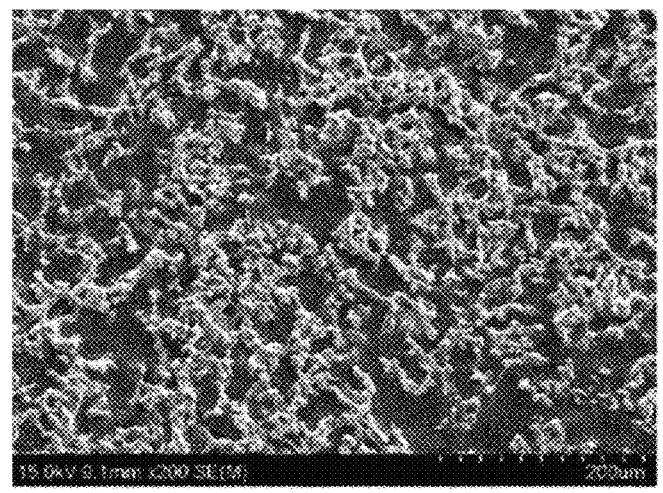
FIG. 4 is a photograph of a composite material formed in Example 3.

A metal porous body was a copper metal foam, where the copper metal foam being in the form of a film having a thickness of about 100 μm or so and having porosity of approximately 75% or so was used. While using a pressure-sensitive adhesive sheet having an acrylic pressure-sensitive adhesive layer with a thickness of about 20 μm or so, the metal foam was placed on the pressure-sensitive adhesive layer and then pressurized with a load of about 3 Kg. Thereafter, polydimethylsiloxane (PDMS, Sylgard 184) was coated on the opposite surface of one surface in contact with the pressure-sensitive adhesive layer of the pressurized copper foam to a thickness of about 20 μm, using a film applicator and thermal curing proceeded in an oven at 120° C. for 20 minutes. After curing, the pressure-sensitive adhesive sheet was removed to prepare a composite material. A scanning electron micrograph of the exposed metal portion of the composite material was shown in FIG. 4.

Example 4

A metal porous body was a copper metal foam, where the copper metal foam being in the form of a film having a thickness of about 100 μm or so and having porosity of approximately 75% or so was used. While using a pressure-sensitive adhesive sheet having an acrylic pressure-sensitive adhesive layer with a thickness of about 20 μm or so, the metal foam was placed on the pressure-sensitive adhesive layer and then pressurized with a load of about 3 Kg. Thereafter, an epoxy resin composition (Kukdo Chemical Co., Ltd., a mixture of YD128 resin and G640 curing agent) was coated on the opposite surface of one surface in contact with the pressure-sensitive adhesive layer of the pressurized copper foam to a thickness of about 20 μm, using a film applicator and thermal curing proceeded in an oven at 80° C. for 60 minutes. Subsequently, the pressure-sensitive adhesive sheet was removed to prepare a composite material.

What is claimed is:

1. A method for preparing a composite material comprising:
    providing a metal porous body comprising a first surface to which a pressure-sensitive adhesive layer is attached and a second surface to which the pressure-sensitive adhesive layer is not attached;
    applying a curable composition to the second surface of the metal porous body;
    curing the curable composition; and then
    removing the pressure-sensitive adhesive layer from the first surface of the metal porous body.

2. The method for preparing the composite material according to claim 1, wherein providing the metal porous body comprises:
    placing the metal porous body on the pressure-sensitive adhesive layer; and
    pressing the metal porous body onto the pressure-sensitive adhesive layer.

3. The method for preparing the composite material according to claim 1, wherein the metal porous body is a metal foam.

4. The method for preparing the composite material according to claim 1, wherein a residue remains on the first surface of the metal porous body after removing the pressure-sensitive adhesive layer, and wherein the method further comprises washing the residue from the first surface of the metal porous body.

5. The method for preparing the composite material according to claim 1, wherein the metal porous body is in the form of a film or sheet having a thickness of 5 μm to 5 cm.

6. The method for preparing the composite material according to claim 5, wherein the metal porous body has a first thickness (T1), and the pressure-sensitive adhesive layer has a second thickness (T2), and a ratio (T2/T1) of the first thickness (T1) and the second thickness (T2) is in a range of 0.05 to 1.

7. The method for preparing the composite material according to claim 1, wherein the metal porous body comprises a skeleton comprising one or more metals or metal alloys selected from the group consisting of iron, cobalt, nickel, copper, phosphorus, molybdenum, zinc, manganese, chromium, indium, tin, silver, platinum, gold, aluminum, stainless steel and magnesium.

8. The method for preparing the composite material according to claim 1, wherein the metal porous body has porosity in a range of 30% to 99%.

9. The method for preparing the composite material according to claim 1, wherein the curable composition is an acrylic curable composition, an epoxy curable composition, an isocyanate curable composition, a urethane curable composition, a polyester curable composition, a polyamic acid curable composition, a polyamide curable composition, a phthalonitrile curable composition or a silicone curable composition.

10. The method for preparing the composite material according to claim 1, wherein the first surface of the metal porous body is opposite to the second surface of the metal porous body.

11. The method for preparing the composite material according to claim 1, wherein the pressure-sensitive adhesive layer comprises a portion protruding into pores of the metal porous body.

12. The method for preparing the composite material according to claim 1, wherein the metal porous body is a copper metal foam having a porosity of 70% to 80%.

* * * * *